Sept. 22, 1959     C. H. MINER     2,905,005

V-BELT POWER TRANSMISSION

Filed July 11, 1955

INVENTOR.

CHARLES H. MINER

BY Anderson and Spangler

ATTORNEYS

United States Patent Office 2,905,005
Patented Sept. 22, 1959

2,905,005

V-BELT POWER TRANSMISSION

Charles H. Miner, Denver, Colo., assignor to The Miner Pulley and Transmission Company, Denver, Colo., a corporation of Colorado Application July 11, 1955, Serial No. 521,221

6 Claims. (Cl. 74—230.17)

This invention relates to a V-belt power transmission system; and, more particularly, to a system that will produce a constant horsepower in a driven element by utilizing the torque developed by the load or driven element to vary the relation between the effective diameters of the drive and driven pulleys.

Basically, the transmission of the present invention is effective to develop constant horsepower in a driven element under a continuous load even though the load may vary between rather wide limits. This, of course, enables the drive motor to run at a constant horsepower and eliminate overloads. Conversely, the transmission will produce a constant horsepower in a driven element under a constant load even though the speed of the drive motor varies thus, again, maintaining a constant horsepower output.

For example, the instant transmission can be used effectively in a printing establishment where paper is wound from a full roll onto another which is constantly increasing in diameter and which if rotated at a constant speed would soon increase the speed of the paper and its tension to a point producing rupture; therefore, by reducing the speed of rotation of the driven roll as it increases in size and maintaining a constant pull or tension thereon by means of the present transmission, this problem is overcome.

Another example is in a machine shop where large plates are surfaced. In this example due to the constant change in the position of the tool from the center of rotation causes a corresponding change in relative tool and work speed with the result that for large plates the lathe has to be frequently adjusted as to speed; whereas, use of the claimed transmission to maintain a constant horsepower at the tool or driven element will reduce the relatool and work speed and make changing the lathe speed unnecessary.

In the description that follows the prime mover may be either a variable speed engine such as an internal combustion engine coupled with a driven element of relatively constant load; or, a prime mover that has a relatively constant output coupled with a driven element attached to a variable load.

Having thus pointed out the general purpose of the invention the mechanism and combination of cooperating elements forming the invention will now be described for which purpose reference will now be had to the accompanying drawing in which the invention has been illustrated, and in which.

Figure 1:
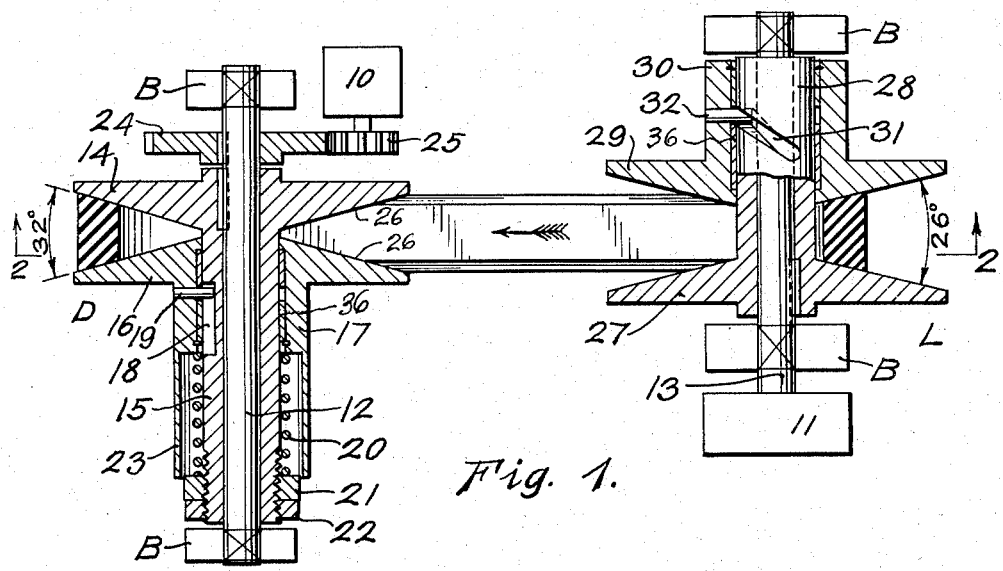
Figure 1 is a longitudinal section through the transmission device showing the variable pitch pulleys in diametrical section.
Figure 2:
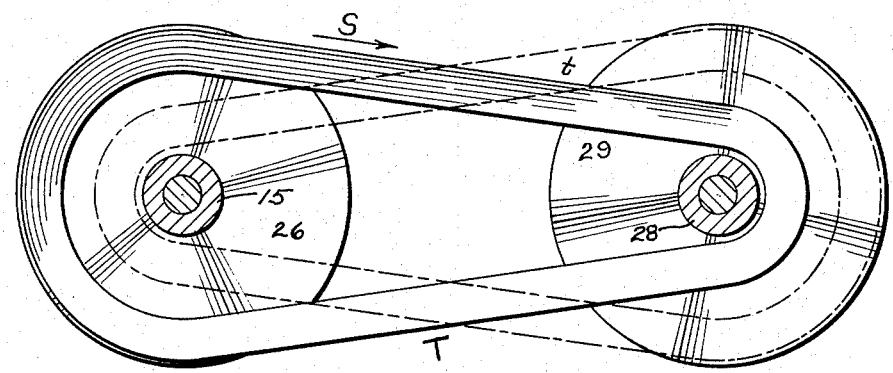
Figure 2 is a section taken on line 2—2 in Figure 1 and shows two extreme positions of the belt, one by full lines and the other by broken lines.

Reference will now be had to the drawing in which the two pulleys are shown in considerable detail while parts representing the source of power and the load have been indicated by blocks. In the drawing the pulley D to the left is driven from the source of power 10 while pulley L is the torque pulley that is operatively connected to the load 11. The several bearings for the shafts 12 and 13 have all been designated by letter B. Pulley D resembles in a general way the pulley shown in Figure 3 of U.S. Patent 2,298,535 and consists of a driven or end section 14 having an elongated tubular hub 15 on which is mounted for relative longitudinal movement section 16 that has a short hub 17. Hub 15 has a straight groove 18 that extends parallel to the axis of hub 15 and the short hub 17 has a pin 19 that projects into the straight groove and prevents section 16 from turning on hub 15. A helical compression spring 20 surrounds hub 15 with its inner end in abutting relation to the end of hub 17. The outer end of spring 20 is in abutting relation to nut 21 which serves as a means for changing the length of the spring and the pressure it exerts on hub 17. A lock nut 22 or other equivalent means serves to prevent nut 21 from moving accidentally. If desired, section 16 may have a hollow cylindrical projection 23 that encloses spring 20 but which is of no functional importance. The importance of the adjustability of spring 20 will be pointed out later. The prime mover 10 has been shown as operatively connected with the drive shaft 12 by two spur gears 24 and 25 which are merely illustrative of means for this purpose. In one particular pulley D differs from similar pulleys, namely, in this that the angle that the inclined surfaces 26 make with each other is 32 degrees which has been found to be the optimum inclination and should be closely approximated. The angular inclination may, of course, vary slightly above or below this. The driven pulley L has a construction that resembles in a very general way the one shown in Figure 2 of U.S. Patent 1,279,547 from which spring 5 has been omitted. Pully L as shown, comprises a stationary section 27 that has an elongated tubular hub 28 that is splined to shaft 13. Section 29 has a hub 30 that has a free sliding fit on hub 28 which is provided with a short helical groove 31 and hub 30 has a radial pin 32 that extends inwardly into the groove. Section 29 can turn on hub 28 through an angle limited by groove 31 and pin 32. Since the groove is helical it is evident that any rotary movement of section 29 on the hub will be accompanied by a longitudinal displacement. As shown in Figure 1, when the top of section 29 moves toward section 27 it will be seen to move downwardly in the figure. The preselected angle of the helical groove 31 and the force exerted by springs 20 cooperate with the angular relation between the frusto-conical belt engaging surfaces to produce the desired effect. The optimum angular relation between the belt engaging surfaces on sections 27 and 29 has been found to be 26 degrees when the corresponding angle on pulley D is 32 degrees. When shaft 13 is drivably connected to a load 11 that requires shaft 13 to turn at a given speed it has been found that the two pulleys will automatically adjust themselves to maintain the speed of shaft 13 constant after the required speed has been reached. For example, if a propeller type fan, of a given diameter is attached to shaft 13 to be driven thereby, that fan will require a fixed amount of power to drive it at a given speed. With the transmission above described the ratio between the rotation of shafts 12 and 13 will automatically adjust itself so that the speed of rotation of shaft 13 and horsepower delivered thereto will remain constant as soon as the predetermined load is reached. If 11 is a generator operating a mechanical refrigerator employing X watts its rotation will remain constant after the normal load has been reached regardless of the speed of rotation of shaft 12.

The power transmitted by the belt is measured by the difference in tension on the tight and slack sides of the belt according to the formula:

(1) $$T-t=(T-tc)\left(\frac{e^{f\theta}-1}{e^{f\theta}}\right)$$

where $T$=total tension of the tight side, lb.
$t$=total tension on the slack side, lb.
$tc=12pbtv^2/g.$=centrifugal tension, lb.
$e=2.718$
$f$=coefficient of friction
$p$=belt weight, lb. per cu. in.

With a belt weight of approximately $0.235b^2$ lb. per ft. and the maximum permissible working load $145b^2$ lb., where $b$ is the belt width at the outer surface, Equation 1 becomes:

(2) $$T-t=nb^2\ (145-0.0073v^2)\left(\frac{e^{fe\theta}-1}{e^{fe\theta}}\right)$$
$$=\frac{33{,}000\times 12\times \text{H.P.}\ Ks}{\pi dN}$$

where $n$=number of individual belts
$d$=pitch diameter of the small pulley, in.
$N$=r.p.m. of small pulley
$Ks$=service factor
$fe$=equivalent or effective coefficient of friction For light duty service $Ks$ may be assumed to be unity and increases with heavier loads. On light duty applications, Equation 2 may be transposed and becomes:

(3) $$\text{H.P.}=\frac{(T-t)}{33{,}000}\left(\frac{\pi dN}{12}\right)$$

since the expression $$\frac{\pi dN}{12}$$

is equivalent to the velocity $s$, of the belt in feet per minute, Equation 3 becomes:

(4) $$\text{H.P.}=\frac{(T-t)s}{33{,}000}$$

Thus it is seen that the horsepower (H.P.) transmitted by the belt is equal to the product of the difference in tensions on the tight and slack sides of the belt in pounds and the speed of the belt in feet per minute divided by 33,000 to convert to H.P.

Referring to Equation 3 it is noted that the horsepower delivered is directly proportional to the effective pitch diameter of the smaller pulley. The transmission described herein responds to the torque developed by a continuous, but variable load to change the effective pitch diameters of the drive and driven pulleys to produce a constant horsepower output which will not overload either the prime mover 10 or the driven element 11.

Assuming a constant power input to driven element 11 from prime mover 10 and driven element 11 being subjected to a continuous, but variable load; as the load increases, the torque pulley L will respond with an increased effective diameter while the effective diameter of drive pulley D decreases to maintain a constant horsepower output by decreasing the speed of the driven shaft 13.

Attention is now directed to the fact that the driving pulley (pulley D) is of the type in which one of the sections has an elongated hub on which the other pulley section slides. A spring urges the movable section towards the other. The movable pulley section is constrained to move in a straight path by means of the straight spline groove 18 and pin 19. The pressure exerted by the spring can be adjusted by means of nut 21 or other equivalent means. The driven pulley differs from the driving pulley principally in this that it has no spring corresponding to spring 20 and the groove 31 is helical and is inclined inwardly in the direction in which the pulley rotates. There is also another very important distinction, namely, the angles between the conical surfaces. In the driving pulley the angle has been shown as 32 degrees and in the driven pulley the corresponding angle is 26 degrees. The angle between the conical surfaces on the driving pulley is greater by 6 degrees than on the driven pulley. It has been shown by a large number of experimental tests that the best results are obtained with the angular relationship shown. The device will function to some extent if these angles vary slightly from those given and applicant does not desire to be limited to the exact angles as shown or to a six degree variation. The compression force exerted by spring 20 must be adjusted to the load for the best results and the angle of groove 31 is also an important variable in the combination but can be varied substantially. Although some results will be obtained with the general combination illustrated so long as the angle between the frusto-conical surfaces differ approximately as shown the best results are attained by a careful adjustment of the spring pressure and the angle of the helical groove 31.

We will now consider the case in which pulley D is rotating at a constant speed and powering a continuous, but variable load. If the load is reduced the effective tension of the belt is reduced and as a result of this disks 14 and 16, which were adjusted for a larger belt tension, are moved closer together by the action of spring 20. Since the belt is not elastic it follows that it must move closer to the center of pulley L. The width of the groove between disks 27 and 29 decreases towards the center and since the belt is not compressible transversely at the pressure to which it is subjected, it follows that disk 29 must turn slightly relative to disk 27 so that the action of groove 31 and pin 32 will permit this outward movement of the disk. The belt, however, is in contact with the conical driving surface of both disks 27 and 29 and tends to turn both in a clockwise direction when viewed as in Figure 2. It follows from the above that there must be some slippage between the belt and disk 29 and repeated tests have shown that this occurs. Attention is directed to the fact that when the load is reduced the automatic adjustment requires disk 29 to turn slightly counter-clockwise relative to disk 27. The increased spreading pressure acting on disks 27 and 29 which is resisted by the action of pin 32 against the outer wall of groove 31 also tends to effect such rearward turning of disk 29 with relation to disk 27. Although the reason for this operation may not be fully understood repeated tests have shown that such adjustment takes place almost instantaneously when the load is reduced.

Figures 3, 4:
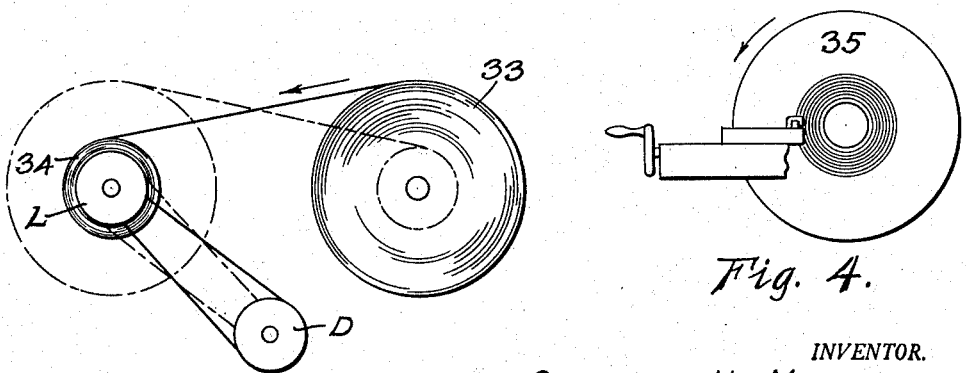
Figure 3 is a diagram showing the transmission employed for rolling and unrolling paper from large rolls; and, Figure 4 is a diagram illustrating the use of the invention in machining surfaces that require the tool to operate at variable distances from the center of rotation.

In Figure 3 numeral 33 represents a roll of print paper that is being transferred to another roll numbered 34. It is obvious that if the speed of roll 34 is adjusted so that the tension in the paper web will be proper when roll 34 is small it will be much too great when roll 34 approaches its ultimate size. The more usual way is to wind the paper onto roll 34 as it comes from the web of the paper making machine. In either case the speed of rotation of roll 34 must be decreased as the diameter of the roll increases, which the above described belt transmission will automatically do.

In Figure 4 numeral 35 designates a face plate of large diameter whose surface is machined. The plate is attached to a lathe and is turned counter-clockwise by means employing the belt transmission to which this invention relates and therefore the speed at which plate 35 rotates can be progressively reduced as the tool moves away from the center of rotation. By properly adjusting the variables the speed at which the face plate turns can be so adjusted that the speed at which the tool moves relative to the work will remain substantially constant.

Attention is now directed to the bushings which have been designated by reference numeral 36 and which are sized for free rotation in the space where they are positioned. These bushings correspond to bushings 25 and 25a in applicant's Patent No. 2,711,103, granted to him on June 21, 1955, and perform the function described in that patent, namely, that of preventing the two parts of the pulley to become immobilized or "frozen" due to the action of fretting corrosion. The views on the drawing have been designed to illustrate the relationship of the elements and are not drawn to any definite scale.

What is claimed as new is:

1. A constant horsepower torque-responsive V-belt transmission comprising in combination: a drive shaft; a driven shaft arranged in laterally spaced parallel relation to the drive shaft; a spring-pressed variable pitch pulley having a fixed section including a tubular hub fixed on the drive shaft, a freely rotatable sleeve mounted on the hub of the fixed section, a movable section including a tubular hub mounted on the tubular hub of the fixed section with the sleeve freely rotatable therebetween, means interconnecting the fixed and movable sections for relative axial movement, said fixed and movable sections cooperating to form a V-shaped belt-receiving groove between opposed faces thereof of approximately 32°, and spring means operatively interconnecting the fixed and movable sections urging the opposed faces thereof closed thereby changing the effective diameter of said spring-pressed drive pulley; a torque-responsive variable pitch pulley having a fixed section including a tubular hub fixed on the driven shaft, said hub having a helical groove, a freely rotatable sleeve mounted on the tubular hub of the fixed section, a movable section including a tubular hub mounted on the tubular hub of the fixed section for combined axial and rotational movement relative to said fixed section with the sleeve freely rotatable between said hubs, pin means carried by the hub of the movable section cooperating with the helical groove to move said movable section toward the fixed section upon rotation of said movable section relative to said fixed section in the direction of rotation of the torque pulley, thereby changing the effective diameter thereof, said fixed and movable sections of the torque pulley cooperating to form a V-shaped belt-receiving groove between opposed faces thereof, and the included angle between the opposed faces of the fixed and movable sections of the torque pulley being approximately 6° less than the corresponding included angle between the opposed faces of the fixed and movable sections of the spring pulley; and, a continuous V-belt mounted in the V-shaped grooves to interconnect the spring and torque pulleys in a power-transmitting relation, the smaller included angle between the opposed faces of the torque pulley acting to produce a greater axial force component in the belt acting to spread the fixed and movable sections thereof when compared with the axial force component produced by the belt acting to spread the fixed and movable sections of the spring pulley.

2. A constant horsepower torque-responsive V-belt transmission comprising in combination: a spring-pressed variable pitch drive pulley having a V-shaped groove formed between two belt-receiving frusto-conical faces of approximately 32°; a torque-responsive variable pitch driven pulley having a V-shaped groove formed between two belt-receiving frusto-conical faces, the included angle between the belt-receiving faces of the driven pulley being at least six degrees less than the corresponding included angle between the belt-receiving faces of the driving pulley; and, a continuous V-belt mounted within the V-shaped grooves, the smaller included angle of the driven pulley providing means whereby the belt will exert a greater axial force component on the belt-receiving faces of the driven pulley than on the faces of the driving pulley tending to spread said faces apart.

3. A constant horsepower torque-responsive V-belt transmission comprising in combination: a spring-pressed variable pitch drive pulley having a V-shaped groove formed between two belt-receiving frusto-conical faces of approximately 32°; a torque-responsive variable pitch driven pulley having a V-shaped groove formed between two belt-receiving frusto-conical faces, the included angle between the belt-receiving faces of the driven pulley being approximately six degrees less than the corresponding included angle between the belt-receiving faces of the driving pulley; and, a continuous V-belt mounted within the V-shaped grooves, the smaller included angle of the driven pulley providing means whereby the belt will exert a greater axial force component on the belt-receiving faces of the driven pulley than on the faces of the driving pulley tending to spread said faces apart.

4. A constant horsepower torque-responsive V-belt transmission comprising in combination: a spring-pressed variable pitch drive pulley having a V-shaped groove formed between two belt-receiving frusto-conical faces; a torque-responsive variable pitch driven pulley having a V-shaped groove formed between two belt-receiving frusto-conical faces, the included angle between the belt-receiving faces of the driven pulley being approximately 26° and the corresponding included angle between the belt-receiving faces of the driving pulley being approximately 32°; and, a continuous V-belt mounted within the V-shaped grooves, the smaller included angle of the driven pulley providing means whereby the belt will exert a greater axial force component on the belt-receiving faces of the driven pulley than on the faces of the driving pulley tending to spread said faces apart.

5. A constant horsepower torque-responsive V-belt transmission comprising in combination: a drive shaft; a driven shaft arranged in laterally spaced parallel relation to the drive shaft; a spring-pressed variable pitch pulley mounted on the drive shaft, said spring pulley having a fixed section and an axially movable section cooperating to form a V-shaped groove of approximately 32° therebetween, axial movement of the movable section acting to change the width of the groove and thereby vary the effective diameter of the spring pulley; a torque-responsive variable pitch pulley mounted on the driven shaft, said torque pulley having a fixed section and a movable section cooperating to form a V-shaped groove therebetween; said movable section of the torque pulley being mounted for simultaneous rotational and axial movement relative to the fixed section to change the width of the V-shaped groove, thereby varying the effective diameter of the torque pulley, relative rotational movement of the movable section of the torque pulley in the direction of belt movement acting to increase the effective diameter of said pulley, and the included angle between the belt-receiving faces of the movable and fixed sections of the torque pulley being at least six degrees less than the corresponding included angle between the belt-receiving faces of the fixed and movable sections of the spring pulley; and, a continuous V-belt within the V-shaped grooves interconnecting the spring and torque pulleys, the smaller included angle between the faces of the torque pulley forming means for increasing the axial force component tending to spread said faces when compared with the axial force component acting to spread the faces of the spring pulley with the larger included angle.

6. A constant horsepower torque-responsive V-belt transmission comprising in combination: a drive shaft; a driven shaft arranged in laterally spaced parallel relation to the drive shaft; a spring-pressed variable pitch pulley mounted on the drive shaft, said spring pulley having a fixed section and an axially movable section cooperating to form a V-shaped groove of approximately 32° therebetween, axial movement of the movable section acting to change the width of the groove and thereby vary the effective diameter of the spring pulley; a torque-responsive variable pitch pulley mounted on the driven shaft, said torque pulley having a fixed section and a movable section cooperating to form a V-shaped groove therebetween; said movable section of the torque pulley being mounted for simultaneous rotational and axial movement relative to the fixed section to change the width of the V-shaped groove, thereby varying the effective diameter of the torque pulley, relative rotational movement of the movable section of the torque pulley in the direction of belt movement acting to increase the effective diameter of said pulley, and the included angle between the belt-receiving faces of the movable and fixed sections of the torque pulley being less than the corresponding included angle between the belt-receiving faces of the fixed and movable sections of the spring pulley and not greater than twenty-six degrees; and, a continuous V-belt within the V-shaped grooves interconnecting the spring and torque pulleys, the smaller included angle between the faces of the torque pulley forming means for increasing the axial force component tending to spread said faces when compared with the axial force component acting to spread the faces of the spring pulley with the larger included angle.

References Cited in the file of this patent

UNITED STATES PATENTS

| | | |
|---|---|---|
| 2,151,987 | Perrine | Mar. 28, 1939 |
| 2,173,661 | Perrine | Sept. 19, 1939 |
| 2,678,566 | Oehrli | May 18, 1954 |

FOREIGN PATENTS

| | | |
|---|---|---|
| 169,894 | Great Britain | Oct. 13, 1921 |
| 258,667 | Switzerland | May 16, 1949 |
| 854,866 | Germany | Nov. 6, 1952 |